(12) United States Patent
Niiyama

(10) Patent No.: US 10,768,866 B2
(45) Date of Patent: Sep. 8, 2020

(54) PRINTING DEVICE, PRINT CONTROL DEVICE, AND METHOD OF CONTROLLING PRINTING DEVICE WITH SHOOTING SECTION FOR TAKING IMAGE

(71) Applicant: SEIKO EPSON CORPORATION, Tokyo (JP)

(72) Inventor: Shinichiro Niiyama, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/575,498

(22) Filed: Sep. 19, 2019

(65) Prior Publication Data

US 2020/0097226 A1   Mar. 26, 2020

(30) Foreign Application Priority Data

Sep. 21, 2018   (JP) ................. 2018-177443

(51) Int. Cl.
*G06F 3/12* (2006.01)

(52) U.S. Cl.
CPC .......... *G06F 3/1207* (2013.01); *G06F 3/1234* (2013.01); *G06F 3/1259* (2013.01); *G06F 3/1262* (2013.01)

(58) Field of Classification Search
CPC .... G06F 3/1207; G06F 3/1234; G06F 3/1259; G06F 3/1262; G06F 3/1285; H04N 1/32122; H04N 1/00411; H04N 1/32694
See application file for complete search history.

(56) References Cited

U.S. PATENT DOCUMENTS

| 7,899,902 B2* | 3/2011 | Hyotani | G06Q 10/10 358/1.13 |
| 2010/0232759 A1* | 9/2010 | Suga | H04N 5/76 386/200 |
| 2018/0063366 A1* | 3/2018 | Mori | H04N 1/32694 |
| 2019/0163422 A1* | 5/2019 | Matsuo | G06F 3/1211 |

FOREIGN PATENT DOCUMENTS

JP   2018-037752   3/2018

* cited by examiner

*Primary Examiner* — Iriana Cruz
(74) *Attorney, Agent, or Firm* — Workman Nydegger

(57) ABSTRACT

A printer includes a printing mechanism configured to print images on a print medium, a print controller configured to execute a job group including a plurality of print jobs configured to print the images to make the printing mechanism print the images in the respective print jobs in sequence to thereby form a single printing result, a detector configured to detect a print error of the printing mechanism, a display device, and a display controller configured to make the display device display a printing position when the print error was detected by the detector.

9 Claims, 7 Drawing Sheets

PRINTING DEVICE, PRINT CONTROL DEVICE, AND METHOD OF CONTROLLING PRINTING DEVICE WITH SHOOTING SECTION FOR TAKING IMAGE

The present application is based on, and claims priority from JP Application Serial Number 2018-177443, filed Sep. 21, 2018, the disclosure of which is incorporated by reference herein in its entirety.

BACKGROUND

1. Technical Field

The present disclosure relates to a printing apparatus, a print control device, and a method of controlling a printing apparatus.

2. Related Art

In the past, in a device for printing an image based on a job, there has been known a device which displays an icon corresponding to a failure when the failure occurs (see, e.g., JP-A-2018-37752 (Document 1)).

SUMMARY

The present disclosure makes it possible for an operator to easily identify the image or the position in which a printing error occurs when printing a plurality of images.

An aspect of the present disclosure is directed to a printing apparatus including a printing mechanism configured to print images on a print medium, a print controller configured to execute a job group including a plurality of print jobs configured to print the images to make the printing mechanism print the images in the respective print jobs in sequence to thereby form a single printing result, a detector configured to detect a print error of the printing mechanism, a display, and a display controller configured to make the display display a printing position when the print error was detected by the detector during execution of any of the print jobs included in the job group.

Another aspect of the present disclosure is directed to a print control device configured to control a printing mechanism configured to print images on a print medium, including a print controller configured to execute a job group including a plurality of print jobs configured to print the images to make the printing mechanism print the images in the respective print jobs in sequence to thereby form a single printing result, a detector configured to detect a print error of the printing mechanism, a display, and a display controller configured to make the display display a printing position when the print error was detected by the detector during execution of any of the print jobs included in the job group.

The print control device described above may be configured such that the display controller makes the display display the image printed when the print error was detected.

The print control device described above may be configured such that the display controller makes the display display a numerical value representing a printing position of the printing mechanism when the print error was detected.

The print control device described above may be configured such that the print controller makes the printing mechanism print the images with printing lengths designated to the print jobs, and the display controller makes the display display symbol images corresponding to the respective print jobs included in the job group in display sizes corresponding to the printing lengths of the print jobs.

The print control device described above may be configured such that the display controller displays the printing position of the printing mechanism when the print error has been detected so as to be superimposed on the symbol image corresponding to the print job executed when the print error was detected.

The print control device described above may be configured such that the display controller makes the display display thumbnail images obtained by contracting the images to be printed by the printing mechanism as the symbol images.

The print control device described above may be configured such that the print control device further includes a shooting section configured to take one of a still image and a moving image of one of a printing position of the printing mechanism and the print medium already printed by the printing mechanism, in which, when the print error was detected by the detector, the display controller makes the display display one of the still image and the moving image taken by the shooting section.

The print control device described above may be configured such that the print control device further includes an input device configured to receive an input, in which, when the input for designating the print error detected by the detector is received by the input device, the display controller reproduces one of the still image and the moving image taken by the shooing section upon occurrence of the print error designated.

Another aspect of the present disclosure is directed to a method of controlling a printing apparatus having a printing mechanism configured to print images on a print medium, the method including the steps of executing a job group including a plurality of print jobs configured to print the images to make the printing mechanism print the images in the respective print jobs in sequence to thereby form a single printing result, detecting a print error of the printing mechanism, and displaying, on a display, a printing position when the print error was detected.

DESCRIPTION OF AN EXEMPLARY EMBODIMENT

An embodiment of the present disclosure will hereinafter be described with reference to the accompanying drawings. It should be noted that although in the embodiment described below, a variety of limitations are provided as preferred specific examples of the present disclosure, the scope of the present disclosure is not limited to the embodiment unless a description to limit the present disclosure thereto is particularly presented in the following explanations.

1. Configuration of Printer

Figure 1:
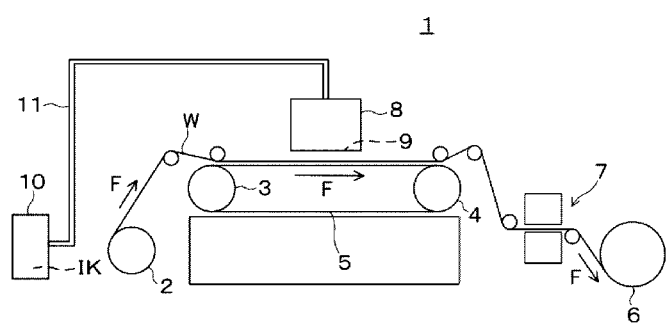
FIG. 1 is a schematic configuration diagram of a printer according to an embodiment.

FIG. 1 is a perspective view showing a configuration of a printer 1.

The printer 1 is an inkjet type printing apparatus which is provided with a print head 9 for discharging ink IK, and discharges the ink IK on a print medium W to form an image.

The print medium W is fabric formed of, for example, natural fibers or synthetic fibers. The printer 1 is a printing machine for making the ink IK adhere to the print medium W as the fabric to thereby perform printing of the print medium W, and the print medium W can be called a printing target material. Further, as the print medium W, it is also possible to use exclusive paper for inkjet recording such as plain paper, high-quality paper, and gloss paper, besides the printing target material described above.

The printer 1 is provided with an unreeling device 2 for conveying the print medium W, conveying rollers 3, 4, a conveying belt 5, and a winding device 6. These sections constitute a conveying mechanism 21 described later. The printer 1 is provided with the print head 9, and an ink cartridge 10 for retaining the ink IK to be used in the print head 9.

The unreeling device 2 is a device for unreeling the print medium W which is elongated, and is wound into a roll, and is located most upstream in the conveying path of the print medium W.

The conveying rollers 3, 4 are a pair of rollers for driving the conveying belt 5 having an endless shape, wherein the conveying roller 3 is a drive roller, and the conveying roller 4 is a driven roller, for example. The conveying belt 5 is a glue belt the surface of which is provided with an adhesive layer having an adhesive property. The print medium W fed from the unreeling device 2 is adhesively fixed to the adhesive layer of the conveying belt 5, and is conveyed in the conveying direction F together with the conveying belt 5.

The conveying belt 5 conveys the print medium W in the conveying direction F, and supports the print medium W at a position opposed to the print head 9.

The print head 9 is mounted on a carriage 8, and reciprocates in a main scanning direction SC described later above the print medium W together with the carriage 8.

The print head 9 is coupled to the ink cartridge 10 with an ink supply channel 11. The printer 1 is capable of performing color printing using the ink IK of a plurality of colors, and the ink IK of four colors of, for example, black (K), cyan (C), magenta (M), and yellow (Y) is used. Further, it is also possible for the printer 1 to have a configuration of using the ink IK of a custom color such as a metallic color. The printer 1 is equipped with the ink cartridge 10 for each color of the ink IK, and the print head 9 is provided with nozzles corresponding respectively to the colors of the ink IK, and jets the ink IK from each of the nozzles.

It is possible for the print head 9 to have a configuration of jetting a soakage to the print medium W besides the ink IK. The soakage is a liquid for facilitating penetration of the ink IK having adhered to the obverse surface of the print medium W to the reverse surface. For example, in the printer 1, it is possible to adopt a configuration in which a cartridge retaining the soakage is coupled to the print head 9 separately from the ink cartridge 10. In this case, the print head 9 discharges the soakage toward the print medium W at the same time as the jet of the ink IK, or at a different timing from the jet of the ink IK.

The winding device 6 is located downstream in the conveying path of the print medium W, and winds the print medium W printed by the print head 9 around a winding reel.

Upstream the winding device 6, there is disposed a drying section 7. The drying section 7 is located between the printing position by the print head 9 and the winding device 6, and dries the ink IK having adhered to the print medium W. The drying section 7 has, for example, a chamber for housing the print medium W and a heater disposed inside the chamber, and dries the ink IK which is located on the print medium W in an undried state with the heat of the heater.

In the configuration shown in FIG. 1, it is also possible to dispose a tensioner, an intermediate conveying roller, or both of the tensioner and the intermediate conveying roller between the unreeling device 2 and the conveying roller 3, and between the conveying roller 4 and the winding device 6. For example, the tensioner provides the tension to the print medium W conveyed by pressing the print medium W with a roller. The intermediate conveying roller conveys the print medium W with, for example, a pair of rollers pinching the print medium W.

Figure 2:
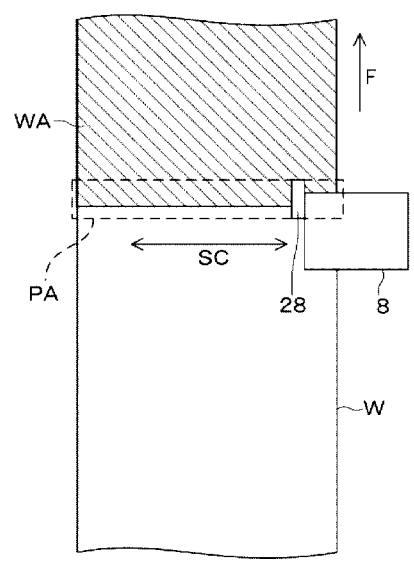
FIG. 2 is a schematic plan view showing a conveying direction of a print medium and a scanning direction of a carriage.

FIG. 2 is a schematic plan view showing the conveying direction of the print medium W and the scanning direction of the carriage 8. In FIG. 2, the area where the ink IK has adhered to the print medium W is represented by hatching as a printed area WA.

The carriage 8 is made to perform a reciprocating scan operation in a direction crossing the conveying direction F of the print medium W. In the present embodiment, the carriage 8 reciprocates in the main scanning direction SC crossing the conveying direction F.

On the carriage 8, there is mounted a shooting section 28. The shooting section 28 is a digital camera which is attached to the carriage 8 to shoot the print medium W from the carriage 8. The shooting section 28 shoots a shooting range including at least a part of the print medium W in accordance with the control by a control section 100 described later. A shot image of the shooting section 28 can be a still image or can also be a video picture.

In FIG. 2, the shooting range of the shooting section 28 is indicated by a symbol PA.

The shooting range PA includes a position where the ink IK is discharged to the print medium W by the print head 9. For example, as shown in FIG. 2, in the conveying direction F, the shooting range PA can also include a boundary between the printed area WA and an area to which the ink IK has not adhered. Further, it is also possible for the shooting range to include an area located downstream from the boundary in the conveying direction F.

It is possible for the shooting section 28 to perform shooting while the carriage 8 performs the scanning action, and the shooting range PA is an area extending along the main scanning direction SC of the carriage 8.

2. Configuration of Control System of Printer

Figure 3:
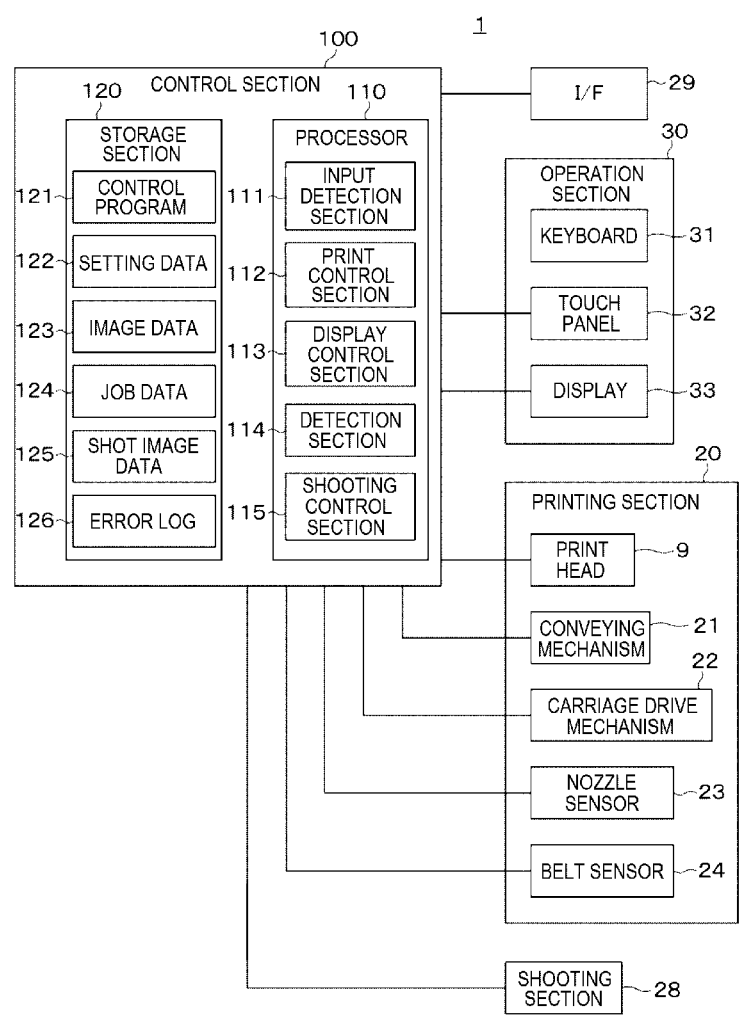
FIG. 3 is a block diagram of the printer.

FIG. 3 is a block diagram of the printer 1.

The printer 1 is provided with the control section 100 for controlling each section of the printer 1. The control section 100 is provided with a processor 110 for executing a program, and a storage section 120. The processor 110 is an arithmetic processing device formed of a CPU (central processing unit), a DSP (digital signal processor), a microcomputer, or the like. Further, the processor 110 can also be constituted by a plurality of pieces of hardware, or can also be formed of a single processor. Further, it is also possible for the processor 110 to be hardware programmed so as to realize the functions of the sections described later. In other words, it is possible for the processor 110 to have a configuration in which a control program 121 is implemented as a hardware circuit. In this case, for example, the processor 110 is formed of an ASIC (application specific integrated circuit) or an FPGA (field programmable gate array).

In the following description, there is described a configuration example for realizing the variety of functions of the control section 100 by the processor 110 executing the control program 121.

The control section 100 corresponds to a print control device.

The storage section 120 has a storage area for storing the program to be executed by the processor 110, and data to be processed by the processor 110. The storage section 120 stores the control program 121 to be executed by the processor 110, and setting data 122 including a variety of types of setting values related to the operation of the printer 1. The storage section 120 has a nonvolatile storage area for storing the program and the data in a nonvolatile manner. Further, it is also possible for the storage section 120 to be provided with a volatile storage area to forma print medium area for temporarily storing the program to be executed by the processor 110 and the data as the processing target.

To the control section 100, there is coupled a printing mechanism 20. The printing mechanism 20 includes the print head 9 and the conveying mechanism 21. The conveying mechanism 21 is a mechanism for conveying the print medium W, and includes the conveying rollers 3, 4 shown in FIG. 1, and a motor for driving these. Further, it is also possible for the conveying mechanism 21 to include the unreeling device 2 and the winding device 6. It is also possible for the conveying mechanism 21 to include the tensioner described above and the intermediate rollers described above.

The printing mechanism 20 in the present embodiment includes a carriage drive mechanism 22, a nozzle sensor 23, and a belt sensor 24. The carriage drive mechanism 22 is a mechanism for reciprocating the carriage 8 in the main scanning direction SC, and includes, for example, a motor as a drive source, a guide member for guiding the movement of the carriage 8, gears, links, and so on for transmitting the power of the motor to the carriage 8.

The nozzle sensor 23 is a sensor for detecting a discharge failure of the nozzle of the print head 9. For example, the nozzle sensor 23 detects a discharge state of the nozzle during a printing operation targeting at a part or the whole of the nozzle provided to the print head 9. The control section 100 detects the discharge failure of the print head 9 based on the detection value of the nozzle sensor 23. As the discharge failure of the print head 9, there can be cited shortage of the amount of the ink IK to be discharged from the nozzle, non-discharge of the ink IK, excessive amount of discharge of the ink IK, and so on.

The belt sensor 24 is a sensor for detecting the state in which a part of the print medium W having adhered to the adhesive layer is separated from the conveying belt 5 in the conveying belt 5. Specifically, the belt sensor 24 detects a phenomenon that the air enters a space between the print medium W and the adhesive layer of the conveying belt 5, and there has been created the state in which the print medium W is separated from the conveying belt 5. This phenomenon is referred to as separation of the print medium W. The control section 100 detects presence or absence of the separation of the print medium W based on the detection value of the belt sensor 24.

To the control section 100, there is coupled the shooting section 28. The shooting section 28 performs shooting in accordance with the control by the control section 100, and then outputs the shot image data to the control section 100.

To the control section 100, there is coupled an interface 29. The interface 29 is abbreviated as I/F in the drawing. The interface 29 is coupled to a device located outside the printer 1 with wire or wirelessly. The interface 29 is provided with, for example, a connector to which a cable is coupled, and an interface circuit for transmitting an electric signal via the cable. Further, it is also possible for the interface 29 to be a wireless communication module having an antenna and an RF circuit. The device located outside the printer 1 is, for example, a computer or a server device. When the control section 100 has received the image data from the external device by the interface 29, the control section 100 stores the image data thus received in the storage section 120. Further, when the control section 100 has received the job data for instructing printing from the external device by the interface 29, the control section 100 stores the job data thus received in the storage section 120.

The printer 1 is provided with an operation section 30. The operation section 30 is provided with a keyboard 31, a touch panel 32, and a display 33. It is also possible for the operation section 30 to have a configuration provided only with either one of the keyboard 31 and the touch panel 32. The display 33 corresponds to a display. Further, the operation section 30 is provided with the keyboard 31 and the touch panel 32 to thereby correspond to an input device.

The keyboard 31 has a plurality of keys to be operated by an operator, and outputs operation data representing the key having been operated to the control section 100. The display 33 has a display screen such as an LCD (liquid crystal display), and displays an image in accordance with the control by the control section 100. The touch panel 32 is disposed so as to be stacked on the display screen of the display 33, detects a contact operation to the display screen, and then outputs the operation data representing the contact position to the control section 100.

3. Configuration of Control Section

The control section 100 is provided with an input detector 111, a print controller 112, a display controller 113, a detector 114, and a shooting control section 115. As described above, by the processor 110 executing the control program 121, for example, these sections are realized due to the cooperation between software and hardware.

The storage section 120 stores the control program 121, the setting data 122, image data 123, job data 124, a shot image data 125, and an error log 126. The control program 121 is a program to be executed by the processor 110, and the setting data 122 includes a setting value related to the execution of the control program 121.

The input detector 111 detects the input operation of the operator based on the operation data input from the keyboard 31 and the touch panel 32, and then obtains the content thus input. The input detector 111 analyzes the data received via the interface 29, and when the image data has been received, the input detector 111 stores the image data in the storage section 120 as the image data 123. Further, when the data related to the print job has been received, the input detector 111 stores the data related to the print job as the job data 124.

The image data 123 is the data of an image to be printed on the print medium W by the print head 9, and it is possible for the storage section 120 to store a plurality of image data 123.

The print controller 112 controls the print head 9, the conveying mechanism 21, and the carriage drive mechanism 22 to perform printing on the print medium W in accordance with the job data 124.

The job data 124 is data for the print controller 112 to perform printing in terms of a job group including a single print job or a plurality of print jobs. Here, the job group will be described.

Figure 4:
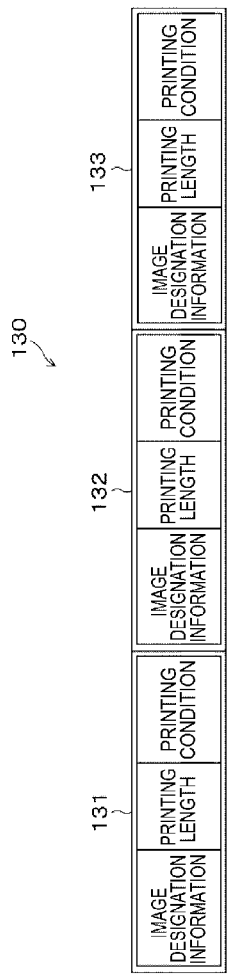
FIG. 4 is a schematic diagram showing a configuration of a job group.

FIG. 4 is a schematic diagram showing a configuration of the job group 130.

The number of print jobs included in the job group to be executed by the printer 1 is not limited, and the job group 130 shown in FIG. 4 is an example of the job group including three print jobs 131, 132, and 133. The arrangement sequence of the print jobs 131, 132, and 133 in the job group 130 represents the sequence in which the print controller performs printing. Therefore, the print jobs 131, 132, and 133 are performed by the print controller 112 in the arrangement sequence in the job group 130.

The print job 131 includes image designation information, printing length, and a printing condition. The image designation information is information for designating an image to be printed on the print medium W, and designates any of the image data 123 stored in the storage section 120. For example, when the storage section 120 stores each of the image data 123 as a single file, the image designation information includes a file name or a file path for designating any of the image data 123.

The printing length is information for designating the length of an area in which the image designated by the image designation information is printed. The printing length designates the size in the conveying direction F of the print medium W on which the image of the print job 131 is printed by, for example, meters. When the printing length is longer than the image size of the image data 123, the print controller 112 repeatedly prints the image of the image data 123 on the print medium W. Therefore, the image data 123 can also be data of a smaller image compared to the printing length. Further, the image data 123 can also be data of an image smaller in size than the print medium W in the direction perpendicular to the conveying direction F, namely smaller in width than the print medium W. In this case, the print controller 112 repeatedly prints the image of the image data 123 also in the width direction of the print medium W.

The printing condition includes a condition when the print head 9 prints the image. For example, the printing condition includes a printing resolution of the image to be printed by the print head 9. Further, the printing condition can also include information for designating printing density or an amount of the ink per unit area.

The print jobs 131, 132, and 133 included in the job group 130 each include the image designation information, the printing length, and the printing condition. Therefore, it is possible for the print controller 112 to print different images with the different printing lengths in the different printing conditions in the respective print jobs 131, 132, and 133 included in the job group 130.

The print controller 112 successively performs the print jobs 131, 132, and 133 included in the job group 130. Therefore, the different images designated by the respective print jobs 131, 132, and 133 are contiguously printed on the print medium W as an elongated medium. Therefore, since there is no chance of causing a blank at a position where the images are switched, or there is no chance for the printing operation to stop when, for example, printing the plurality of images in sequence, it is possible to efficiently perform printing while reducing the time required for printing and waste of the print medium W.

The job data 124 can be provided with a configuration of including data related to a plurality of job groups 130.

The print controller 122 refers to the job data 124 to obtain the data of the job group 130 designated by an operation of the operation section 30. The print controller 112 performs printing in the print jobs 131, 132, and 133 included in the job group 130 thus designated in the order included in the job group 130.

The display controller 113 controls the display 33 to display a variety of images.

The detector 114 detects a print error. The print error is a failure occurring when the print head 9 performs printing on the print medium W, and denotes a state of affecting the printing quality. In the present embodiment, the detector 114 detects the print error when the discharge failure of the print head 9 and the separation of the print medium W in the conveying belt 5 occur while the print controller 112 is performing printing. Specifically, the detector 114 obtains the detection values of the nozzle sensor 23 and the belt sensor 24 during printing to detect the discharge failure of the print head 9 and the separation of the print medium W in the conveying belt 5 based on the detection values thus obtained.

The shooting control section 115 controls the shooting section 28 to perform shooting to obtain the shot image data, and then stores the shot image data in the storage section 120 as the shot image data 125.

Further, when the print error has been detected by the detector 114, the print controller 112 stores the printing position at the moment when the print error has been detected, the content of the print error, and the shot image of the shooting section 28 in the storage section 120 as the error log 126.

The error log 126 is data including the printing position at the moment when the print error has been detected, the content of the print error, and the shot image of the shooting section 28 for each print error detected by the detector 114. Further, the error log 126 can also include a thumbnail image generated from the shot image corresponding to the print error, and when the shot image corresponding to the print error is a video picture, it is also possible for the error log to include an image of a frame cut out from the video picture or a thumbnail image of the frame.

4. Operation of Printer

Then, an operation of the printer 1 will be described.

Figure 5:
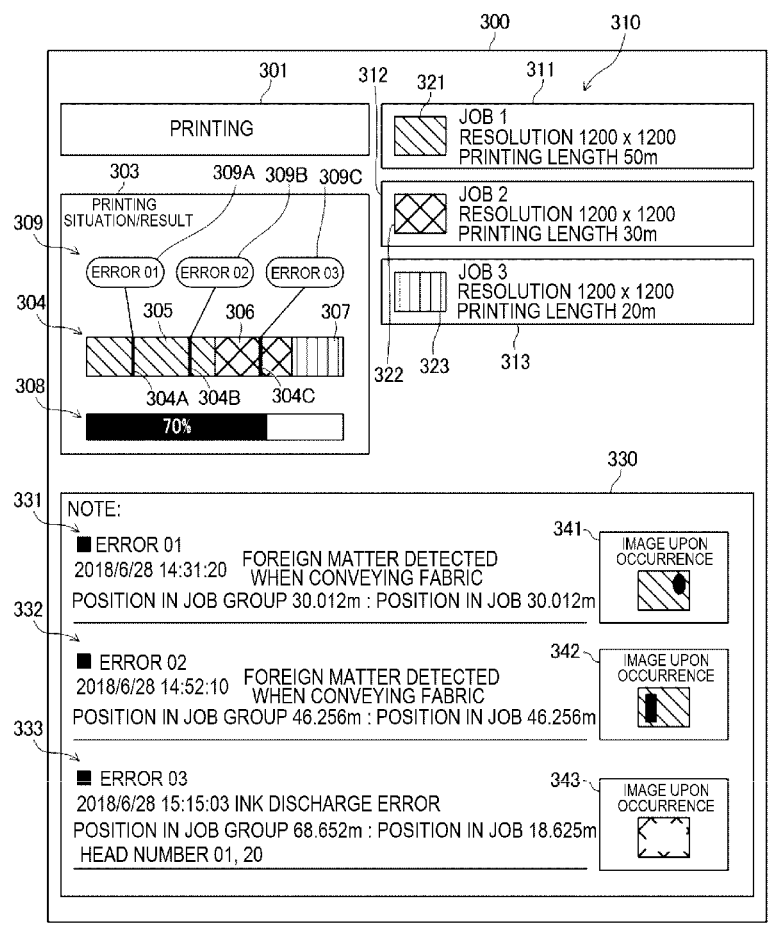
FIG. 5 is a diagram showing a configuration example of a print status screen.

FIG. 5 is a diagram showing a configuration example of a print status screen 300 to be displayed on the display 33.

The print status screen 300 is an example of a screen which the display controller 113 makes the display 33 display while the print controller is performing printing.

In the print status screen 300, there are arranged a status display 301, a result display 303, a print job display 310, and a notification display 330.

The status display 301 is a display area for displaying the status of the operation of the printer 1. The status of the printer 1 has, for example, two alternatives, namely PRINTING and STANDBY. Since the example shown in FIG. 5 shows a state in which the print controller 112 is performing printing, PRINTING is displayed in the status display 301.

The result display 303 is an area for displaying the situation of printing and the result of the printing operation. In the result display 303, there are arranged a job group image 304 corresponding to the job group currently performed by the print controller 112 or the job group having already been performed, and a progress status image 308.

The job group image 304 includes symbol images 305, 306, and 307 representing the print jobs constituting the job group. The respective symbol images represent the respective print jobs included in the job group. The symbol image is a thumbnail image of the image to be printed in the corresponding print job. In other words, the symbol images 305, 306, and 307 are images obtained by contracting the images of the image data 123 to be printed on the print medium W, respectively.

The symbol images 305, 306, and 307 are displayed in the sizes corresponding to the printing lengths of the print jobs, respectively. The ratio between the display sizes of the images of the symbol images 305, 306, and 307 is the same as the ratio between the printing lengths of the print jobs corresponding to the respective symbol images. For example, the display controller 113 sets the display size of the symbol image in the job group image 304 to 1/200 of the printing length. Further, it is also possible for the display controller 113 to determine the display sizes of the symbol images 305, 306, and 307 by fixing the overall display size of the job group image 304, and then prorating the display size of the job group image 304 in accordance with the printing lengths of the respective print jobs including in the job group. The arrangement sequence of the symbol images 305, 306, and 307 in the job group image 304 is the same as the execution sequence of the print jobs in the job group. For example, the symbol image 305 located on the leftmost side of the job group image 304 represents the first print job in the execution sequence.

The progress status image 308 is an image representing the progress status of the job group, and is displayed in the same display size as that of the job group image 304 due to the control by the display controller 113. The progress status image 308 is an image which has an appearance of, for example, a progress bar, and shows a part in which printing by the print head 9 is completed out of the whole of the job group with an altered display configuration. Further, as shown in FIG. 5, a numerical value representing the proportion of the part in which printing is completed to the whole of the job group can also be displayed in the progress status image 308. In this case, the display controller 113 shows the proportion of the part in which printing is completed with reference to the length of the print medium W in the conveying direction F.

Further, in the result display 303, there is disposed an error display 309. The error display 309 displays information related to the print error detected by the detector 114 during printing. The error display 309 is displayed based on the error log 126.

In the error display 309, there are displayed error icons 309A, 309B, and 309C each representing one error detected by the detector 114. In the job group image 304, there are displayed error position indications 304A, 304B, and 304C each representing the printing position of the print head 9 when the print error has been detected so as to correspond respectively to the error icons 309A, 309B, and 309C. It should be noted that when the print error has been detected by the detector 114 can be rephrased as when the print error has occurred.

The error position indication 304A represents the position of the print error represented by the error icon 309A. Similarly, the error position indications 304B, 304C represent the positions of the print errors represented by the error icons 309B, 309C, respectively.

The display positions of the error position indications 304A, 304B, and 304C in the job group image 304 represent the printing positions in the conveying direction F when the print errors have occurred, respectively. Therefore, it is possible for the operator to easily figure out the positions where the print errors have occurred with reference to the printing lengths of the print jobs included in the job group using the error position indications 304A, 304B, and 304C, respectively.

The print job display 310 is an area for displaying information related to the print jobs included in the job group displayed in the result display 303. In the example shown in FIG. 5, the print job display 310 includes print job content displays 311, 312, and 313 corresponding respectively to the three print jobs. The print job content displays 311, 312, and 313 each correspond to one print job, and the arrangement sequence of the print job content displays 311, 312, and 313 in the print job display 310 is the same as the execution sequence of the print jobs.

The print job content display 311 includes a thumbnail image 321 of the image to be printed in the print job. Further, in the print job content display 311, there are displayed characters representing the printing condition and the printing length. Similarly, the print job content displays 312, 313 include thumbnail images 322, 323 of the images to be printed in the print jobs, and include characters representing the printing conditions and the printing lengths, respectively.

The notification display 330 is an area for displaying information of which the operator should be notified regarding printing to be performed by the print controller 112.

In the notification display 330, there is displayed the information representing, for example, the print error detected by the detector 114. In the example shown in FIG. 5, print error information 331, print error information 332, and print error information 333 each including information related to the print error are displayed in the notification display 330. The print error information 331, the print error information 332, and the print error information 333 are displayed based on the error log 126.

The print error information 331 includes the information representing time when the print error has been detected, the content of the print error, and the printing position when the print error has been detected with respect to the print error represented by the error icon 309A. The printing position can be a numerical value with reference to a print start position of the job group, or can also be a numerical value with reference to a print start position of the print job. It is preferable for the content of the print error to be an expression easy for the operator to figure out, and for example, the separation of the print medium W detected by the belt sensor 24 can also be displayed as "FOREIGN MATTER DETECTED WHEN CONVEYING FABRIC."

An error shot image 341 is displayed so as to correspond to the print error information 331. The error shot image 341 is a thumbnail image of the shot image taken by the shooting section 28 when the detector 114 has detected the print error. When the shooting section 28 has taken a video picture, the error shot image 341 is a thumbnail image of a frame cut out from the video picture.

The print error information 332 and the print error information 333 each include the information representing time when the print error has been detected, the content of the print error, and the printing position when the print error has been detected with respect to the print errors represented by the error icons 309B, 309C, respectively. Further, error shot images 342, 343 as thumbnail images similarly to the error shot image 341 are displayed so as to correspond to the print error information 332 and the print error information 333, respectively.

In the print status screen 300, when an operation of the touch panel 32 for selecting the error shot image 341 has been received, it is also possible for the display controller 113 to display the shot image by the shooting section 28 corresponding to the error shot image 341 in an enlarged manner. The error shot image 341 is a thumbnail image generated from the shot image data 125, and the display controller 113 reproduces the shot image data 125 from which the thumbnail image is originated in accordance with an operation to the error shot image 341. When reproducing the shot image data 125, it is also possible for the display controller 113 to pop up a different window from the print status screen 300, or to display the error shot image 341 in an enlarged manner. Further, when the shot image data 125 is a video picture, it is also possible for the display controller 113 to reproduce and display the video picture at the display position of the error shot image 341 in accordance with the operation to the error shot image 341. It is also possible to perform substantially the same process also on the error shot images 342, 343.

Further, also when the operation corresponding to any of the error position indications 304A, 304B, and 304C, or any of the error icons 309A, 309B, and 309C has been detected in the state in which the print status screen 300 is displayed, it is also possible to reproduce the shot image data 125. On this occasion, the display controller 113 identifies the error position indications 304A, 304B, and 304C or the error icons 309A, 309B, and 309C thus operated, and then identifies the shot image data 125 corresponding thereto, and then performs the enlarged display of the still image or the reproduction of the video picture.

Here, when the operation section 30 is provided with a pointing device such as a mouse, it is also possible for the display controller 113 to display a pointer which moves in accordance the operation of the pointing device so as to be superimposed on the print status screen 300. In this case, it is also possible for the display controller 113 to display the shot image data 125 when the pointer overlaps the error shot image 341, 342, or 343, the error position indication 304A, 304B, or 304C, or the error icon 309A, 309B, or 309C.

Figure 6:
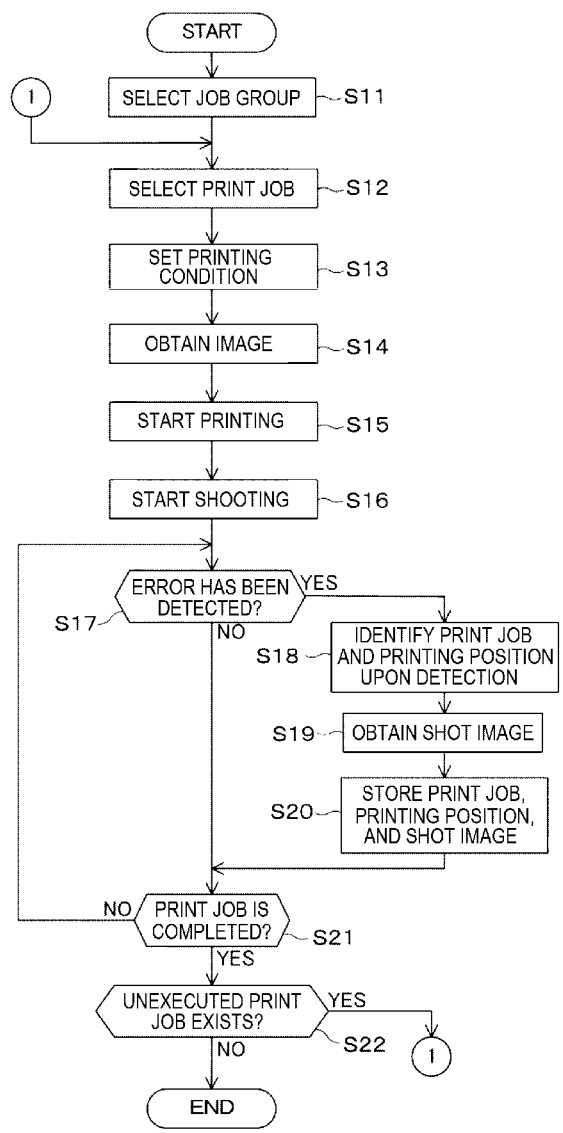
FIG. 6 is a flowchart showing an operation of the printer.

FIG. 6 is a flowchart showing the operation of the printer 1, and shows the operation related to the printing process on the print medium W.

The print controller 112 selects (step S11) the job group to be executed from the job groups included in the job data 124 in accordance with the input operation detected by the operation section 30. The print controller 112 selects (step S12) one print job from the print jobs included in the job group selected in the step S11 in accordance with the execution sequence of the print jobs.

The print controller 112 obtains the printing condition of the print job to be executed, and then sets (step S13) the printing condition. Subsequently, the print controller 112 obtains (step S14) the image to be printed in the print job from the image data 123.

The print controller 112 controls the printing mechanism 20 to start (step S15) printing on the print medium W, and the shooting control section 115 starts (step S16) shooting by the shooting section 28 in accordance therewith. On and after the step S16, the shooting control section 115 performs periodical shooting for taking still images, or shooting for taking a video picture using the shooting section 28, and occasionally obtains the shot image data to store the shot image data in the storage section 120.

The detector 114 determines (step S17) presence or absence of the print error based on the detection values of the nozzle sensor 23 and the belt sensor 24. When it has been determined that the print error has been detected (YES in the step S17), the print controller 112 identifies (step S18) the print job which has been in progress when the print error has been detected, and the printing position. The printing position can be identified based on, for example, the conveying amount of the print medium W which the conveying mechanism 21 has conveyed since the start of the printing.

The print controller 112 identifies and then obtains (step S19) the shot image data 125 taken when the print error has been detected out of the shot image data 125 taken due to the control by the shooting control section 115. The print controller 112 includes the print job and the printing position identified in the step S18, and the shot image data 125 obtained in the step S19 in the error log 126, and then stores (step S20) the error log 126 in the storage section 120. Subsequently, the control section 100 makes the transition of the process to the step S21.

Further, when it has been determined that the detector 114 has not detected the print error (NO in the step S17), the control section 100 makes the transition of the process to the step S21.

In the step S21, the print controller 112 determines (step S21) whether or not the print job has been completed. When the printing in the print job has not been completed (NO in the step S21), the control section 100 returns the process to the step S17.

When the print job has been completed (YES in the step S21), the print controller 112 determines (step S22) whether or not the print job having not been executed exists in the job group selected in the step S11. When the print job having not been executed exists (YES in the step S22), the control section 100 returns the process to the step S12. When the print job having not been executed does not exist (NO in the step S22), the control section 100 terminates the present process.

Figure 7:
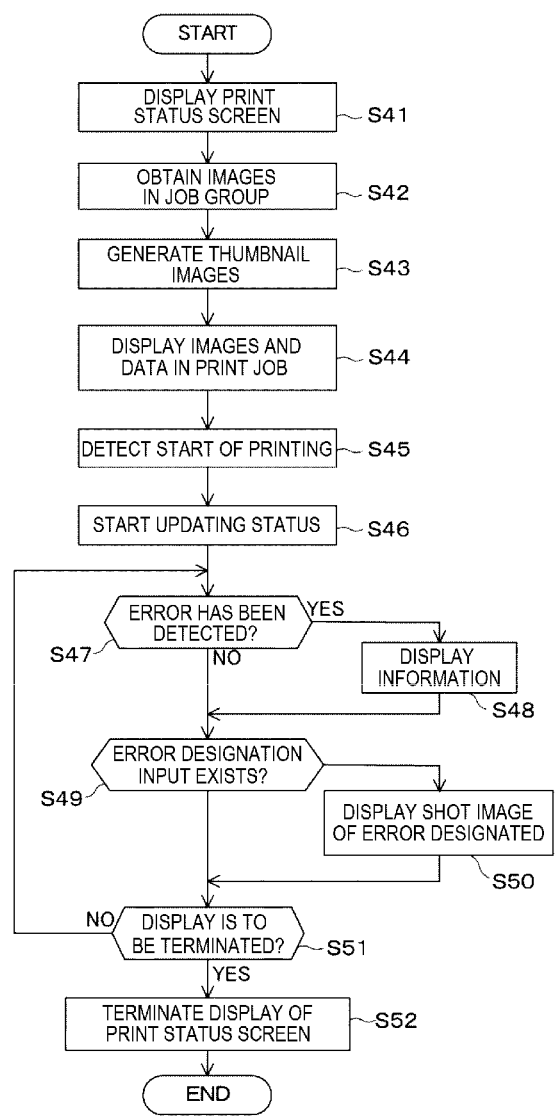
FIG. 7 is a flowchart showing an operation of the printer.

FIG. 7 is a flowchart showing the operation of the printer 1, and shows the operation related to the display of the print status screen 300.

The display controller 113 displays (step S41) the print status screen 300, and then obtains (step S42) the image data 123 of the print jobs included in the job group selected by the print controller 112 in the step S11 from the storage section 120.

The display controller 113 generates (step S43) the thumbnail images from the image data 123 obtained in the step S42, and then displays (step S44) the thumbnail images thus generated and the data of the respective print jobs in the print job content displays 311, 312, and 313. The data of the respective print jobs each include the printing condition and the printing length.

When the display controller 113 detects (step S45) the fact that the printing has been started by the print controller 112, the display controller 113 starts (step S46) a process of displaying the result display 303 and the notification display 330.

The display controller 113 determines (step S47) whether or not the print error has been detected by the detector 114. When the print error has been detected (YES in the step S47), the display controller 113 displays (step S48) the information of the error log 126 related to the print error thus detected in the result display 303 and the notification display 330, and then makes the transition of the process to the step S49. Further, when it has been determined that the detector 114 has not detected the print error (NO in the step S47), the display controller 113 makes the transition of the process to the step S49.

In the step S49, the print controller 113 determines (step S49) whether or not an error has been designated in the result display 303 or the notification display 330 by an input in the operation section 30. When the error has been designated (YES in the step S49), the display controller 113 obtains the shot image data 125 corresponding to the error thus designated from the storage section 120, then reproduces (step S50) the shot image data 125, and then makes the transition of the process to the step S51. Further, when it has been determined that the error has not been designated (NO in the step S49), the display controller 113 makes the transition of the process to the step S51.

In the step S51, the display controller 113 determines (step S51) whether to terminate the display of the print status screen 300. It is also possible to display the print status screen 300 in a period after the printing in the job group has been terminated in addition to the period in which the printing by the print controller 112 is in operation. When the termination of the display of the print status screen 300 has been instructed by, for example, an input in the operation section 30, the display controller 113 makes an affirmative determination in the step S51.

When the display of the print status screen 300 is not terminated (NO in the step S51), the display controller 113 returns the process to the step S47. When the display of the print status screen 300 is terminated (YES in the step S51), the display controller 113 terminates (step S52) the display of the print status screen 300, and then terminates the present process.

As described hereinabove, the printer 1 according to the present embodiment is provided with the printing mechanism 20 for printing an image on the print medium W. The printer 1 is provided with the print controller 112 for executing the job group including a plurality of print jobs for printing images to make the printing mechanism 20 print the images in the respective print jobs to thereby form a single printing result. The printer 1 is provided with the detector 114 for detecting the print error of the printing mechanism 20, the display 33, and the display controller 113 for making the display 33 display the printing position when the print error has been detected by the detector 114 during the execution of any of the print jobs included in the job group.

According to the printing apparatus, the print control device, and the printer 1 to which the method of controlling the printing apparatus is applied, it is possible for the operator to easily identify the image or the position where the print error has occurred. For example, in the print status screen 300, the error position indications 304A, 304B, and 304C are displayed in the job group image 304 displayed in the result display 303. Therefore, it is possible for the operator to visually know with ease the printing position where the print error has been detected.

When the print medium W printed by the printer 1 is subsequently processed or shipped, there is performed inspection work for checking the printing quality. In the general inspection work, it is necessary to visually search for the place where the printing quality deteriorates due to the print error, and then confirm the state of the print medium W. However, when the print medium W is a cloth product used for manufacturing a clothing ornament or an interior product, the length of the print medium W, and the printing length thereof printed by the printer 1 are made long. Therefore, both of the weight and the size of what is obtained by winding the print medium W having been printed using the winding device 6 are difficult for the human to handle. Therefore, the labor of the work of unreeling the print medium W having been wound by the winding device 6 and then visually confirming the state is heavy.

According to the printer 1 to which the present disclosure is applied, it is possible to identify the image and the position where the print error has occurred by displaying the print status screen 300 without unreeling the print medium W as the real thing. Therefore, in the inspection work, it is possible to significantly reduce the burden of the work for unreeling the print medium W as the real thing to search for the place where the printing quality has deteriorated.

In particular, when printing a single printing result by a job group including a plurality of print jobs, since the plurality of print jobs is performed on one print medium W, it is not easy to visually search in a rapid manner for the place where the printing quality has deteriorated. In contrast, when performing printing using the printer 1, it is possible to easily identify the place where the print error has occurred in the print medium W on which the plurality of print jobs has been performed. For example, where the print error has been detected in what print job out of the print jobs included in the job group can be displayed so as to easily be figured out by the operator using the print status screen 300. Thus, it is possible to achieve a reduction in burden of the inspection work after the printing, and an improvement in efficiency.

The display controller 113 makes the display 33 display the image which has been printed when the print error has been detected. For example, the printer 1 displays the error shot images 341, 342, and 343 in the notification display 330 in the print status screen 300. Therefore, it is possible for the operator to easily know the state of the print medium W when the print error has been detected.

The display controller 113 makes the display 33 display the numerical value representing the printing position of the printing mechanism 20 when the print error has been detected. For example, in the print status screen 300, the printing position when the print error has been detected is displayed as each of the error position indications 304A, 304B, and 304C and the print error information 331, the print error information 332, and the print error information 333. Thus, it is possible for the operator to easily figure out the positions where the printing quality has deteriorated due to the print error.

The print controller 112 makes the printing mechanism 20 print the image with the printing length designated to the print job. The display controller 113 makes the display 33 display the symbol images corresponding to the respective print jobs included in the job group in the display sizes corresponding to the printing lengths of the print jobs. For example, in the print status screen 300, the symbol images 305, 306, and 307 corresponding to the images to be printed in the print jobs are displayed in the result display 303. Therefore, it is possible to display the images to be printed in the job group and the printing lengths of the respective images in an intuitively easy-to-understand manner.

The display controller 113 displays the printing position of the printing mechanism 20 when the print error has been detected so as to be superimposed on the symbol image corresponding to the print job which has been executed when the print error has been detected. For example, in the print status screen 300, the error position indications 304A, 304B, and 304C are displayed so as to be superimposed on the symbol images 305, 306, and 307. Therefore, it is possible to display the positions of the print errors in the images to be printed in the job group in an intuitively easy-to-understand manner.

The display controller 113 makes the display 33 display the thumbnail images obtained by contracting the images to be printed by the printing mechanism 20 as the symbol images. For example, the thumbnail images generated from the image data 123 are used as the symbol images 305, 306, and 307 displayed in the print status screen 300. Thus, it is possible to display the images to be printed in the job group and the printing lengths of the respective images in a more easy-to-understand manner.

The printer 1 is provided with the shooting section 28 for taking a still image or a moving image of the printing position of the printing mechanism 20 or the print medium W having already been printed by the printing mechanism 20. When the print error has been detected by the detector 114, the display controller 113 makes the display 33 display the still image or the moving image having been taken by the shooting section 28. For example, in the print status screen 300, the error shot images 341, 342, and 343 corresponding to the print errors are displayed. Therefore, the state of the print medium W when the print error has occurred can be displayed in an intuitively easy-to-understand manner. For example, since the printing quality can visually be checked in a simplified manner using the error shot images 341, 342, and 343, it is possible to perform simplified inspection work.

The printer 1 is provided with an operation section 30 for receiving an input. When an input for designating the print error having been detected by the detector 114 is received by the input to the operation section 30, the display controller 113 reproduces the still image or the moving image which has been taken by the shooing section upon occurrence of the print error thus designated. Thus, it is possible for the operator to more accurately know the state of the print medium W when the print error has occurred. Therefore, since it is possible to visually check the influence of the print error on the printing quality without actually unreeling the print medium W, it is possible to perform the simplified inspection work using the display by the display 33.

It should be noted that the embodiment described above shows a specific example to which the present disclosure is applied, and the present disclosure is not limited to the embodiment.

For example, although in the embodiment described above, the description is presented citing the printer 1 for conveying the print medium W wound to form a rolled shape to print an image thereon as an example, the present disclosure is not limited to this example. For example, it is possible to apply the present disclosure to a printer for fixedly holding the print medium such as the fabric as a print target, and relatively moving the print head 9 with respect to the print medium to thereby perform printing. For example, it is also possible to apply the present disclosure to a so-called garment printer for fixing clothing or sewing cloth as the print medium, and discharging ink to the print medium to thereby perform printing. Further, it is also possible to apply the present disclosure to a printing apparatus for performing printing not only on the fabric, but also on a knitted material, paper, a sheet made of synthetic resin, and so on.

Further, the application target of the present disclosure is not limited to a device used alone as the printing apparatus, but it is also possible to apply the present disclosure to a device having a function other than the printing function such as a multifunctional machine having a copying function or a scanning function, or a POS terminal device.

Further, the printer 1 can also be a device using the ink IK curing by ultraviolet irradiation, and in this case, it is also possible to provide the printer 1 with an ultraviolet irradiation device instead of the drying section 7. Further, it is also possible for the printer 1 to have a configuration provided with a washing device for washing the print medium W having been dried by the drying section 7, and other detailed configurations of the printer 1 can arbitrarily be changed.

Further, the functional sections of the control section 100 can be constituted as a program to be executed by the processor 110 as described above, and in addition, it is also possible to realize the functional sections of the control section 100 by a hardware circuit incorporating the program. Further, it is also possible to adopt a configuration in which the printer 1 receives the program described above from a server device or the like via a transmission medium.

What is claimed is:

1. A printing apparatus comprising:
   a printing mechanism configured to print images on a print medium;
   a print controller configured to execute a job group including a plurality of print jobs configured to print the images to make the printing mechanism print the images in the respective print jobs in sequence to thereby form a single printing result;
   a detector configured to detect a print error of the printing mechanism;
   a display;
   a display controller configured to make the display display a printing position when the print error was detected by the detector during execution of any of the print jobs included in the job group; and
   a shooting section configured to take one of a still image and a moving image of one of a printing position of the printing mechanism and the print medium already printed by the printing mechanism,
   wherein when the print error is detected by the detector, the display controller makes the display display one of the still image and the moving image taken by the shooting section.

2. A print control device configured to control a printing mechanism configured to print images on a print medium, comprising:
   a print controller configured to execute a job group including a plurality of print jobs configured to print the images to make the printing mechanism print the images in the respective print jobs in sequence to thereby form a single printing result;
   a detector configured to detect a print error of the printing mechanism;
   a display;
   a display controller configured to make the display display a printing position when the print error was detected by the detector during execution of any of the print jobs included in the job group; and
   a shooting section configured to take one of a still image and a moving image of one of a printing position of the printing mechanism and the print medium already printed by the printing mechanism,
   wherein when the print error is detected by the detector, the display controller makes the display display one of the still image and the moving image taken by the shooting section.

3. The print control device according to claim 2, wherein the display controller makes the display display the image printed when the print error was detected.

4. The print control device according to claim 2, wherein the display controller makes the display display a numerical value representing a printing position of the printing mechanism when the print error was detected.

5. The print control device according to claim 2, wherein
the print controller makes the printing mechanism print the images with printing lengths designated to the print jobs, and
the display controller makes the display display symbol images corresponding to the respective print jobs included in the job group in display sizes corresponding to the printing lengths of the print jobs.

6. The print control device according to claim 5, wherein the display controller displays the printing position of the printing mechanism when the print error has been detected so as to be superimposed on the symbol image corresponding to the print job executed when the print error was detected.

7. The print control device according to claim 5, wherein the display controller makes the display display thumbnail images obtained by contracting the images to be printed by the printing mechanism as the symbol images.

8. The print control device according to claim 2, further comprising:
an input device configured to receive an input, wherein when the input for designating the print error detected by the detector is received by the input device, the display controller reproduces one of the still image and the moving image taken by the shooing section upon occurrence of the print error designated.

9. A method of controlling a printing apparatus having a printing mechanism configured to print images on a print medium, the method comprising: executing a job group including a plurality of print jobs configured to print the images to make the printing mechanism print the images in the respective print jobs in sequence to thereby form a single printing result; detecting a print error of the printing mechanism; displaying, on a display, a printing position when the print error was detected; and a shooting section taking one of a still image and a moving image of one of a printing position of the printing mechanism and the print medium already printed by the printing mechanism, wherein when the print error is detected, the display displays one of the still image and the moving image taken by the shooting section.

* * * * *